(12) United States Patent
    Stepanovich

(10) Patent No.: US 10,726,436 B2
(45) Date of Patent: Jul. 28, 2020

(54) SYSTEM AND METHOD FOR MANAGING GRATUITIES

(71) Applicant: Gratuity, LLC, Naples, FL (US)

(72) Inventor: Aleksandar Stepanovich, Naples, FL (US)

(73) Assignee: Gratuity, LLC, Naples, FL (US)

( * ) Notice: Subject to any disclaimer, the term of this patent is extended or adjusted under 35 U.S.C. 154(b) by 0 days.

(21) Appl. No.: 15/679,748

(22) Filed: Aug. 17, 2017

(65) Prior Publication Data

US 2018/0130081 A1    May 10, 2018

Related U.S. Application Data

(63) Continuation of application No. 13/834,466, filed on Mar. 15, 2013, now Pat. No. 9,741,050.

(60) Provisional application No. 61/696,569, filed on Sep. 4, 2012.

(51) Int. Cl.
    *G06Q 30/02*    (2012.01)
    *G06Q 10/10*    (2012.01)
    *G06Q 30/06*    (2012.01)
    *G06Q 50/12*    (2012.01)
    *G06Q 40/00*    (2012.01)

(52) U.S. Cl.
    CPC ....... *G06Q 30/0214* (2013.01); *G06Q 10/105* (2013.01); *G06Q 30/06* (2013.01); *G06Q 40/10* (2013.01); *G06Q 50/12* (2013.01)

(58) Field of Classification Search
    CPC .................................................... G06Q 40/10
    See application file for complete search history.

(56) References Cited

U.S. PATENT DOCUMENTS

2014/0365322 A1* 12/2014 Phillips .................. G06Q 40/00
                                                                    705/16

* cited by examiner

*Primary Examiner* — A. Hunter Wilder
(74) *Attorney, Agent, or Firm* — FisherBroyles, LLP

(57) ABSTRACT

A computer-implemented method for allocating gratuities is disclosed that includes employing at least one processor configured to execute computer-executable instructions stored in memory to perform the following acts: receiving transaction information from a point of sale, wherein the transaction information comprises at least gratuity data for each of a plurality of transactions during an accounting period; receiving employee information from the point of sale, wherein the employee information comprises at least hours worked for each of a plurality of employees during the accounting period; receiving gratuity distribution rules for allocating gratuities among at least a portion of the employees; and determining a gratuity allocation for each applicable employee of the plurality of employees based on at least the received transaction information, the received employee information, and the received gratuity distribution rules. Also disclosed is a computer-implemented system for managing gratuity allocations.

12 Claims, 9 Drawing Sheets

| Shifts | Jobs | Pools | Tips | Reports | Employees |

These settings define which jobs generate and/or receive tips.

| SALES | TIPS | CASH | TEAM | JOB |
|---|---|---|---|---|
| ☐ | ☑ | ☐ | ☑ | BARBACK |
| ☑ | ☑ | ☑ | ☑ | BARTENDER |
| ☐ | ☑ | ☐ | ☑ | BUSSERS |
| ☑ | ☑ | ☑ | ☐ | FOOD SERVER |
| ☐ | ☑ | ☐ | ☑ | HOSTESS |
| ☐ | ☐ | ☐ | ☐ | KITCHEN |
| ☑ | ☑ | ☐ | ☐ | MARKET |
| ☐ | ☑ | ☐ | ☑ | RUNNER |
| ☐ | ☑ | ☐ | ☑ | SOMMELIER |

FIG. 5

| Shifts | Jobs | Pools | Tips | Reports | Employees |

These settings define tip pools and their distribution types.

| 1 | JOB<br>FOOD SERVER | DISTRIBUTION TYPE<br>EQUALLY |
|---|---|---|
| 2 | JOB<br>BARTENDER | DISTRIBUTION TYPE<br>BY GENERATED HOURS |
| 3 | JOB<br>HOSTESS | DISTRIBUTION TYPE<br>BY GENERATED HOURS |
| 4 | JOB<br>SOMMELIER | DISTRIBUTION TYPE<br>BY GENERATED HOURS |
| 5 | JOB<br>BUSSERS | DISTRIBUTION TYPE<br>BY GENERATED HOURS |
| 6 | JOB<br>BARBACK | DISTRIBUTION TYPE<br>BY GENERATED HOURS |
| 7 | JOB<br>MARKET | DISTRIBUTION TYPE<br>BY GENERATED HOURS |
| 8 | JOB<br>RUNNER | DISTRIBUTION TYPE<br>BY GENERATED HOURS |

Sunday, January 01 2012    Transactions | Break Down

| ID ◇ | Name ◇ | Shift ◇ | Job ◇ | Clocked In ◇ | Clocked Out ◇ | Total Time ◇ | CC Tips ◇ | Cash Sales ◇ | Team ◇ |
|---|---|---|---|---|---|---|---|---|---|
| 3 | Edgar Edgar | BREAKFAST | BUSSERS | 08:00 | 12:00 | 4:00 | 0.00 | 0.00 | |
| 2 | John John | BREAKFAST | BARTENDER | 08:00 | 11:30 | 3:30 | 500.00 | 300.00 | |
| 1 | Mary Mary | BREAKFAST | FOOD SERVER | 07:15 | 11:30 | 4:15 | 120.00 | 700.00 | |
| 6 | Megan Megan | BREAKFAST | FOOD SERVER | 08:00 | 11:30 | 3:30 | 220.00 | 600.00 | |
| 5 | Rose Rose | BREAKFAST | RUNNER | 08:00 | 11:00 | 3:00 | 0.00 | 0.00 | |
| 4 | Samantha Samantha | BREAKFAST | BUSSERS | 09:45 | 11:45 | 2:00 | 0.00 | 0.00 | |
| | | | | | | | 840.00 | 1,600.00 | |
| | | | | | | | OK | OK | |

FIG. 9

Sunday, January 01 2012    Transactions | Break Down

| Shift ▲ | Job ◇ | Name ◇ | Total Time ◇ | Fee | Total CC Tips ◇ | CC Tip Out | Total Cash Sales | Total Cash Tips | Cash Tip Out ◇ | Pool ◇ | Pool Share | Grat Share ◇ |
|---|---|---|---|---|---|---|---|---|---|---|---|---|
| BREAKFAST | BARTENDER | John John | 3:30 | 0.00 | 500.00 | 65.00 | 300.00 | 45.00 | 5.85 | 555.10 | 555.10 | 510.10 |
| BREAKFAST | BUSSERS | Edgar Edgar | 4:00 | 0.00 | 0.00 | 0.00 | 0.00 | 0.00 | 0.00 | 26.75 | 17.83 | 7.83 |
| BREAKFAST | BUSSERS | Samantha Samantha | 2:00 | 0.00 | 0.00 | 0.00 | 0.00 | 0.00 | 0.00 | 26.75 | 8.92 | 8.92 |
| BREAKFAST | FOOD SERVER | Mary Mary | 4:15 | 0.00 | 120.00 | 32.40 | 700.00 | 105.00 | 28.35 | 173.25 | 173.25 | 66.25 |
| BREAKFAST | FOOD SERVER | Megan Megan | 3:30 | 0.00 | 220.00 | 59.40 | 600.00 | 90.00 | 24.30 | 238.70 | 238.70 | 148.70 |
| BREAKFAST | RUNNER | Rose Rose | 3:00 | 0.00 | 0.00 | 0.00 | 0.00 | 0.00 | 0.00 | 86.20 | 86.20 | 86.20 |
| | | | | 0.00 | 840.00 | 156.80 | 1,600.00 | 240.00 | 58.50 | | | 840.00 |
| Shift | Job | Name | Total Time | Fee | Total CC Tips | CC Tip Out | Total Cash Sales | Total Cash Tips | Cash Tip Out | Pool | Pool Share | Grat Share |

SYSTEM AND METHOD FOR MANAGING GRATUITIES

RELATED APPLICATION

This application is a continuation application of and claims priority to and the benefit of U.S. patent application Ser. No. 13/834,466, filed Mar. 15, 2013, now U.S. Pat. No. 9,741,050, and to U.S. Patent Application No. 61/696,569, filed Sep. 4, 2012, the disclosures of which are incorporated herein by reference in their entirety.

BACKGROUND AND SUMMARY

The present disclosure is related to a system and method for managing gratuities, and more particularly to calculating, allocating, and distributing gratuities among service employees.

In the hospitality industry and many other service based businesses, it is customary for customers to give a gratuity or tip to one or more employees who perform the purchased service. Although a customer may primarily interact with one employee of the business, such as a waiter or waitress, many other employees have assisted to varying degrees in supporting the service provided to the customer. In a restaurant, for example, a host may seat the customer, a busser may clear the table, a food runner may deliver food to a table, a bartender may prepare and/or serve alcoholic beverages, and other employees may similarly provide specific services for the benefit of the customer during their dining experience. At the conclusion of a restaurant transaction, the customer generally gives a gratuity to the server or adds the gratuity to the amount paid for the meal. The gratuity may then be shared among the employees who assisted in providing service to the customer, or aggregated and distributed among the employees according to customs or practices of a given business or industry. The sharing of gratuities has often been manually calculated and documented with ad hoc record keeping, complicating compliance with tax and labor regulations. Even when properly computed, existing systems for gratuity sharing have not provided easy access to the gratuity sharing data. As such, there remains a need for systems and methods for managing gratuities that provide both employers and employees with accurate and timely allocations of gratuities in a cost-effective manner.

Presently disclosed is a computer-implemented method for allocating gratuities that includes employing at least one processor configured to execute computer-executable instructions stored in memory to perform the following acts: receiving transaction information from a point of sale, wherein the transaction information comprises at least gratuity data for each of a plurality of transactions during an accounting period; receiving employee information from the point of sale, wherein the employee information comprises at least hours worked for each of a plurality of employees during the accounting period; receiving gratuity distribution rules for allocating gratuities among at least a portion of the employees; and determining a gratuity allocation for each applicable employee of the plurality of employees based on at least the received transaction information, the received employee information, and the received gratuity distribution rules.

The method may also include allocating to each applicable employee the determined gratuity allocation for that employee. In embodiments, the transaction information is sales data for the plurality of transactions during the accounting period, and the transactions are service transactions provided by the plurality of employees. In an embodiment, at least one processor is remote from the point of sale and may be a cloud computing system.

Receiving the transaction information and employee information for the accounting period may further include receiving a computer-readable file containing the transaction information and the employee information for the accounting period, and storing the received transaction information and the received employee information in a database, and may include receiving the computer readable file from the point of sale via the Internet.

The method may also include determining a total gratuity amount for the accounting period from the transaction information, and determining the gratuity allocation for each of the plurality of employees based on the total gratuity amount for the accounting period.

The method may also include classifying each of the plurality of employees to one of a plurality of gratuity groups based on a job function of the employee; and wherein determining the gratuity allocation for each employee further comprises: allocating gratuities to form a gratuity pool for each gratuity group based on the gratuity distribution rules and allocating the gratuity pool for each gratuity group between the employees of the gratuity group based on the distribution rules.

Allocating the determined group gratuity between the employees of the group may also include determining a total of the hours worked by each employee of the group for the accounting period, and allocating a portion of the gratuity pool for the gratuity group to each employee of the group corresponding to a ratio of the hours worked by that employee to the total hours worked of the group.

Allocating the determined group gratuity between the employees of the group may also include receiving an assigned gratuity factor for each of the plurality of employees, and allocating at least a portion of the gratuity pool for the gratuity group to each employee based upon the employee's assigned gratuity factor.

Determining the gratuity allocation for each of the plurality of employees may further include determining a total of gratuities received by a first group of employees; and allocating a portion of the total of gratuities received by the first group of employees to a second group of employees based on the distribution rules.

Determining the gratuity allocation for each of the plurality of employees may further include determining total cash sales during the accounting period from the transaction information, determining a total cash gratuity from the total cash sales, and allocating the total cash gratuity to the plurality of employees based on the distribution rules.

The method for allocating gratuities may also include communicating the determined gratuity allocation for each employee to an employer payroll system and distributing the determined gratuity allocation to each employee through a payroll check. The method may also include providing a web-portal configured to be accessed by employees, wherein the web-portal is configured to display the determined gratuity allocation for a given employee, and providing a web-portal configured to be accessed by an employer, wherein the web-portal is configured to display the determined gratuity allocation for the plurality of employees. The method may also include, upon determining the gratuity allocation for a given employee, notifying the employee via at least one of a text message, an email, or an instant message of the determined gratuity allocation.

In embodiments, the method is used for each of a plurality of employers and gratuity distribution rules may be received from each of the plurality of employers, with the gratuity distribution rules received from one employer being different than the gratuity distribution rules received from at least one other employer.

Also disclosed is a computer-implemented system for managing gratuity allocations that includes at least one processor coupled to at least one memory configured to execute the following computer-executable components stored in the at least one memory: a database configured to store transaction information and employee information, wherein the transaction information comprises gratuity data for each of a plurality of transactions during an accounting period, and wherein the employee information comprises at least hours worked for each of a plurality of employees during the accounting period; a configuration module configured to receive gratuity distribution rules for allocating gratuities among at least a portion of the employees; a processor configured to determine a gratuity allocation for each of the plurality of employees based at least on the transaction information, the employee information, and the distribution rules; and a reporting module configured to report the determined gratuity allocation for each of the plurality of employees.

In embodiments, the system for managing gratuities also includes an interface component configured to receive the transaction information from the point of sale and to communicate the transaction information to the database to be stored, and configured to receive the employee information from the point of sale and to communicate the employee information to the database to be stored.

The system may also include means for receiving transaction information from a point of sale and storing the received transaction information in the database, and means for receiving employee information from a point of sale and storing the received employee information in the database.

In some embodiments, the reporting module may include web-portal configured to be accessed by employees, wherein the web-portal is configured to display the determined gratuity allocation for a given employee, and a web-portal configured to be accessed by an employer, wherein the web-portal is configured to display the determined gratuity allocation for the plurality of employees.

In another embodiment, the reporting module is configured to communicate with an employer payroll system and to communicate the determined gratuity allocations to the employer payroll system.

BRIEF DESCRIPTION OF THE DRAWINGS

Reference is made to the accompanying drawings in which particular embodiments of the invention are illustrated as described in more detail in the description below, in which:

FIG. 5 is a first screen of an exemplary configuration module;

FIG. 6 is a second screen of an exemplary configuration module;

FIG. 7 is a third screen of an exemplary configuration module;

FIG. 8 is a first screen of an exemplary employer web-portal; and

FIG. 9 is a second screen of an exemplary employer web-portal.

DETAILED DESCRIPTION OF THE DRAWINGS

Figure 1:
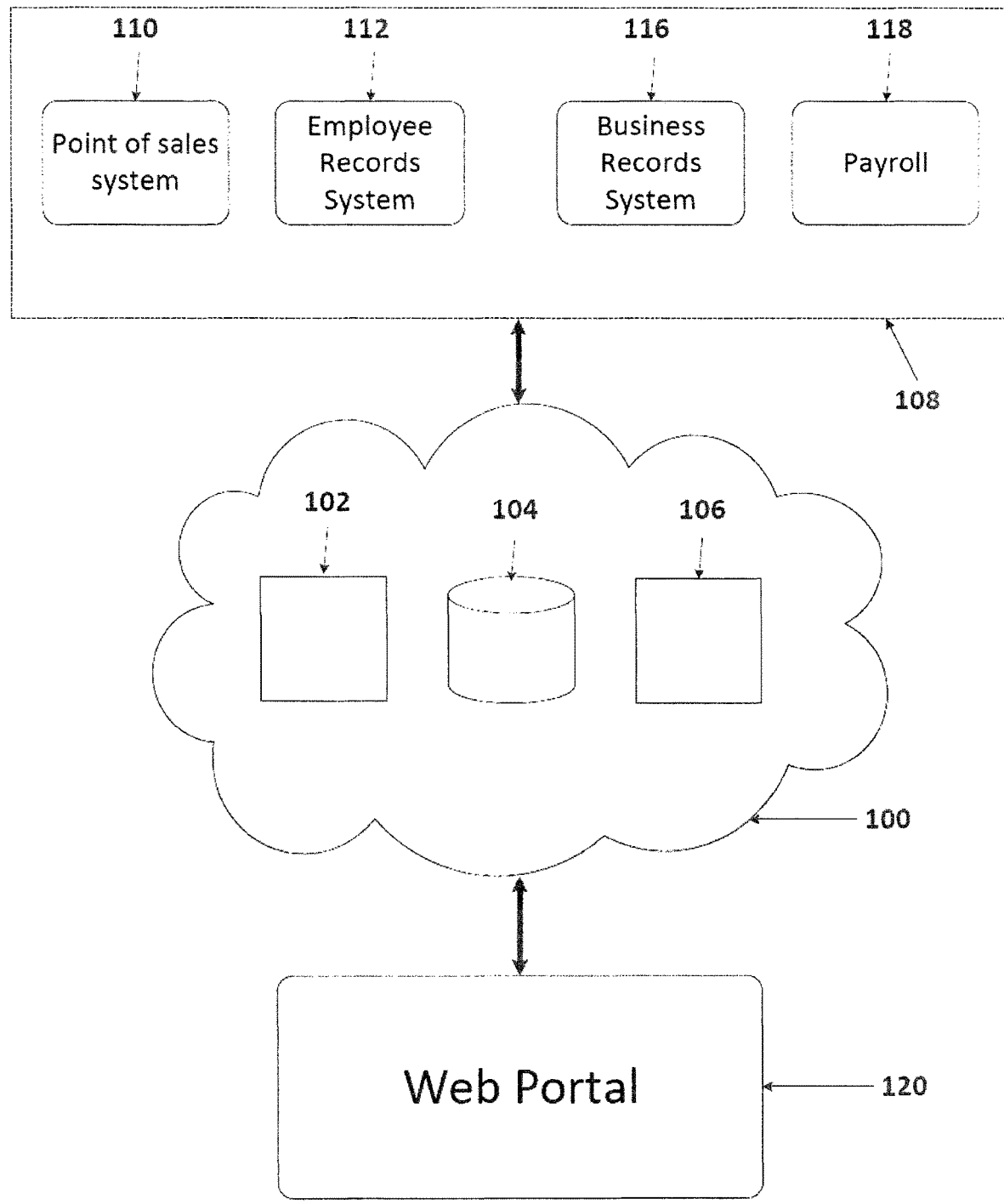
FIG. 1 is a schematic view of a gratuity management system.

Embodiments of the presently disclosed system and method relate to the management of gratuities. Referring generally to FIGS. 1 through 3, embodiments of the system and method for managing gratuities are illustrated. For purposes of illustration, the system and method may be described with reference to a restaurant setting. The system and method may be applied in other settings, such as hotels, casinos or other organizations in the hospitality or other industries that receive and distribute gratuities among at least a portion of the employees.

Referring now to FIG. 1, a system 100 for managing gratuities is illustrated. In an embodiment the gratuity management system 100 includes a processor 102 and a database 104. The system 100 communicates with systems to receive transaction information and employee information for managing gratuities. By way of illustration, the system 100 may receive transaction information from a point of sale system 110. The point of sale system 110 may provide a record of sales transactions. Each transaction information associated with the sales records may include the type of transaction (e.g., cash or credit card), the amount of the transaction, and the amount of a gratuity associated with the transaction. The transaction information may also include the employee who processed the transaction (e.g., a server or bartender) as well as the date and time of the transaction. Other information, such as credit card processing fees or items purchased, may be include in the transaction information as desired.

The gratuity management system 100 may receive employee information from an employee records system 112. The employee information may include biographic information about each employee such as a job title or code (e.g. server, host, busser) that may be used to determine how the employee participates in the gratuity system. The employee information may also include work record data, such as the hours for each employee. The employee records system 112 may be a time keeping system used to track the hours worked by employee. In some embodiments, the employee records system 112 and the point of sale system 110 may be components of a management system used for administering the service business.

In embodiments, the point of sale system 110 and the employee records system 112 may be discrete systems in communication with the presently disclosed system for managing gratuities. In other embodiments, the point of sale system 110, the employee records system 112, and perhaps other systems are integrated into a restaurant management system 108. As such, the gratuity management system 100 may interface with one or more components of such a restaurant management system 108 to acquire the necessary transaction and employee information. In the restaurant context, a combined point of sale system 110 and employee records system 112 may assign each employee a unique user identification number, which may be used both for logging that employee's working hours (e.g. a time-clock application) as well as recording transactions (e.g. customer orders) entered and completed by the employee. In some embodiments, the point of sale system 110 and/or the employee records system 112 may be implemented in cloud computing systems reducing the burden on businesses to host these systems using local computing resources. The gratuity management system 100 may similarly be implemented in a cloud computing system that interfaced with the cloud-based point of sale and/or employee records systems. A business or other user of the gratuity management system may therefore select computing resources to implement various elements of the systems, and the gratuity management system presently disclosed is contemplated to operate in conjunction with both local and cloud-based point of sale and/or employee records systems.

The management of gratuities for a given business or organization may be defined by the customs and practices of the business as well as applicable regulations. To account for the variation in gratuity management practices, the gratuity management system 100 receives gratuity distribution rules, such as from a client (e.g. a restaurant), that are used to determine the allocation of gratuities for the client's business. In one embodiment, the gratuity management system 100 includes a configuration module 106 that may be used to establish the distribution rules to be applied by the system as described in more detail below.

The gratuity management system 100 receives the transaction information, employee information, and distribution rules as noted above. Using this information, the system 100 determines a gratuity allocation for each employee who should receive a portion of the gratuities collected. For purposes of this disclosure, employees may be generally characterized as a gratuity-generating employee, a gratuity-receiving employee, or a non-participating employee. A gratuity-generating employee may be defined as an employee who receives a gratuity from a customer. Servers, bartenders and valets are common examples of gratuity-generating employees. A gratuity-receiving employee is defined as an employee who is allocated at least a portion of a gratuity received by a gratuity generating employee. Hosts, bussers and barbacks are common examples of gratuity-receiving employees. Servers, bartenders and valets are also gratuity-receiving employees, as such, any given employee may be both gratuity-generating and gratuity-receiving, depending upon the service provided and the nature of the business. In addition, a business may have non-participating employees who neither receive nor benefit from gratuities. Such non-participating employees may include kitchen or cleaning staff and employees in management level positions. The customs and practices of a given business or industry, as well as, applicable labor regulations may determine whether a given individual is eligible to participate in the distribution of gratuities. The gratuity management system 100 determines how to allocate the gratuities collected by or on behalf of the gratuity-generating employees among the gratuity-receiving employees based upon the transaction information, employee information, and distribution rules for the given business.

The determined gratuity allocation for each employee represents the amount of gratuity to be allocated to that employee based on the transaction information, employee information, and distribution rules discussed above. Gratuity allocations may be performed on a periodic basis, referred to herein as the accounting period. Some businesses may allocate gratuities for each shift, each day or each week. Gratuities are typically allocated at least as frequently as the payroll period for the business so that gratuities may be distributed in the employees' paychecks. In one embodiment, the gratuity management system 100 is configured to allow an employer to "cash-out" one or more employees at the end of an employee's shift so that the gratuity allocation may be determined and the gratuity distributed to the employee. In this embodiment, the gratuity management system 100 may rely on transaction and employee information already received to determine the cashed-out employee's allocation. If additional transaction information or employee information is received that would affect the allocation to the cashed-out employee, the gratuity management system 100 may recalculate the gratuity for the previously cashed-out employee and apply any adjustment or correction to a future gratuity or payroll distribution to ensure the proper distribution of income to that employee. The employer is therefore able to determine and distribute gratuity allocations in real-time or near real-time benefiting the employees and reducing the burden on the employers.

After the conclusion of an accounting period, the gratuity allocation for each employee may be determined. The gratuity management system 100 may then communicate with a business records system 116 that may include a payroll component 118. The business records system 116 is configured to receive the determine gratuity allocations for use in distributing the gratuity payments to employees. In some instances, the business records system 116 may determine that an employee has received an insufficient allocation of gratuities to comply with applicable regulations and an adjustment may be made to that employee's pay to compensate for the shortfall in gratuities received. Embodiments of the system 100 may interface directly with a payroll component 118. For example, the system 100 may communicate with a payroll system so that the determined gratuity allocation is added to the employee's next paycheck. In some embodiments, the payroll component 118 of the business records system 116 may be a third-party payroll management system, however, the gratuity management system 100 may be configured to communicate with a third-party system in the same manner as described above. In a similar manner, the gratuity management system 100 may generate a report of employee's gratuity income, where the report is configured for submission to the Internal Revenue Service and/or state or local tax authorities for purposes of reporting gratuity income.

In some embodiments, the business records system 116 and/or payroll component 118 may be integrated with the point of sale system 110 and the employee records system 112, all as part of an integrated restaurant management system 108. In other embodiments, one or more of the business records system 116 and/or the payroll component 118 may be separate systems. In one example, the payroll component 118 may be a third-party payroll service selected by the restaurant to process payroll for its employees, and the gratuity management system 100 may communicate directly with the payroll processor to distribute gratuities to the employees.

The gratuity management system 100 may also allow for employees and employers to access relevant portions of the data stored in the system. In one embodiment, the system 100 includes a web-portal 120. The web-portal 120 may be configured to allow employees access to their own determined gratuity allocation so that the employee may view their accumulated gratuities following an accounting period. The system 100 may also be configured to notify an employee of the employee's gratuity allocation through a text message, an email, an instant message or other similar notifications. In other embodiments, the system 100 may be configured to post the gratuity allocation for an employee to the employee's web-based social network profile where the employee may access the information. Employee access to the gratuity allocation data may be limited through the use of usernames and passwords such that each employee may access only the gratuity information relative to that employee. The system 100 may also permit an employee to view the data from which the gratuity allocation was determined, such as the employee's hours worked or total gratuities received that employee. In some embodiments, a fee may be assessed for the employee's use of the system, which may be deducted from the gratuities otherwise allocated to the employee. Other information may be made accessible as appropriate for the employee and the business involved.

The web-portal 120 may also provide for access by an employer, such as the manager or owner of the business. Through the portal, the employer may access information on all employees and the data from which the gratuity allocations were made. The system 100 may also include a reporting module configured to report the determined gratuity allocation for each of the plurality of employees. The reporting module may also be configured to provide other management reports. In one embodiment, the system 100 generates a report of total gratuities allocated to each employee during a payroll period to assist in documenting compliance with minimum wage regulations and income tax withholding requirements. The system 100 may also include non-web based means for accessing the data and may generate notifications or alerts to assist an employer in managing the business. In this manner, the gratuity management system 100 may substantially streamline the process of calculating and distribution gratuities, while also generating timely and accurate business compliance records.

The gratuity management system 100 may store the gratuity data, as well as the transaction information and employee information from which the gratuity allocations were produced. The information stored and the duration of that storage may be selected based upon the requirements of the business and regulatory or tax requirements. In one embodiment, the gratuity data is retained for at least six years. Employees may retain access to the gratuity data for the required duration even after termination of their employment. In this manner, the gratuity management system allows a business, such as a restaurant, to ensure that gratuity data will be available to both current and former employees without requiring the former employees to contact the business directly.

Figure 2A:
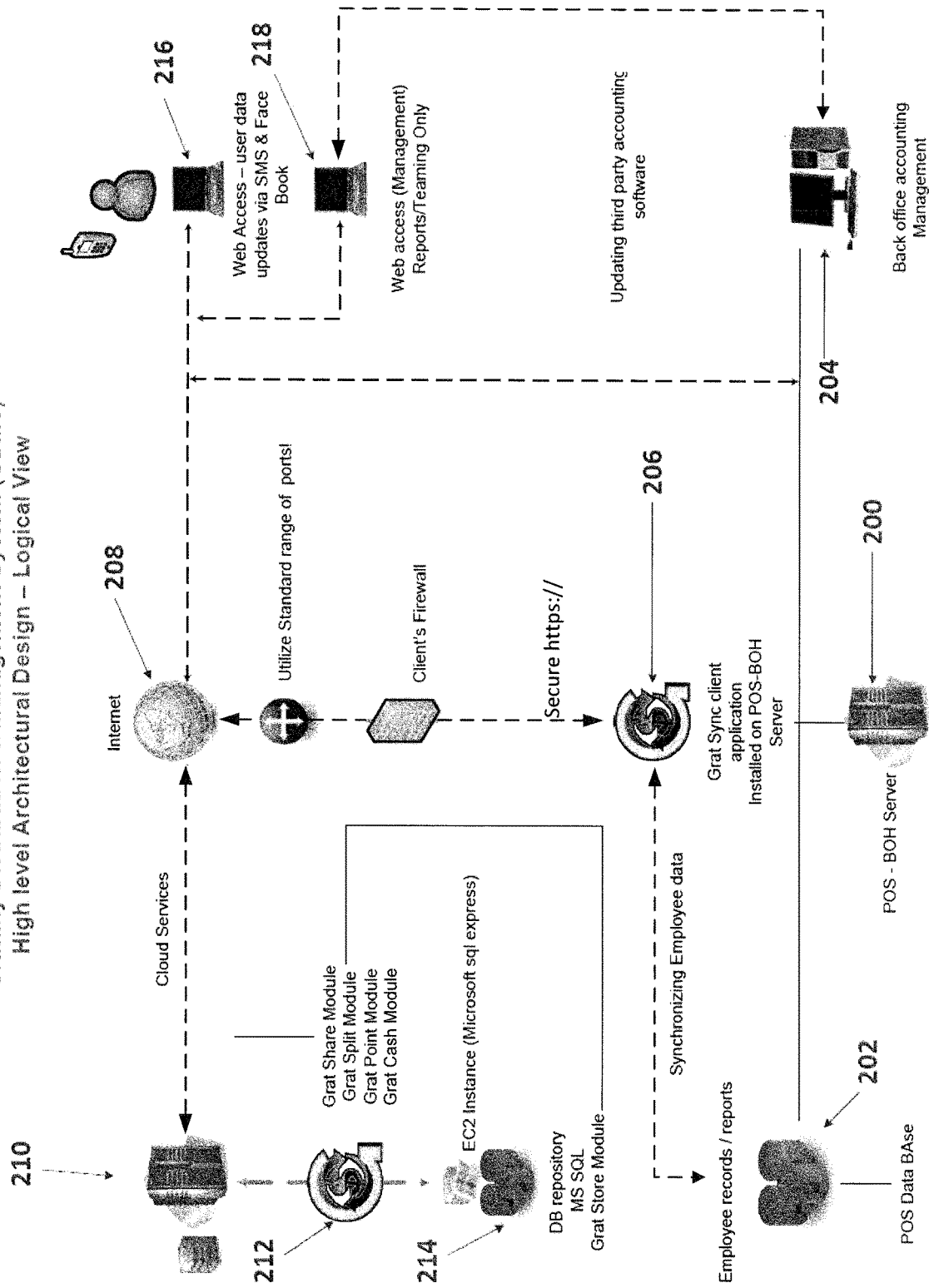
FIG. 2A is another schematic view of a gratuity management system.
Figure 3:
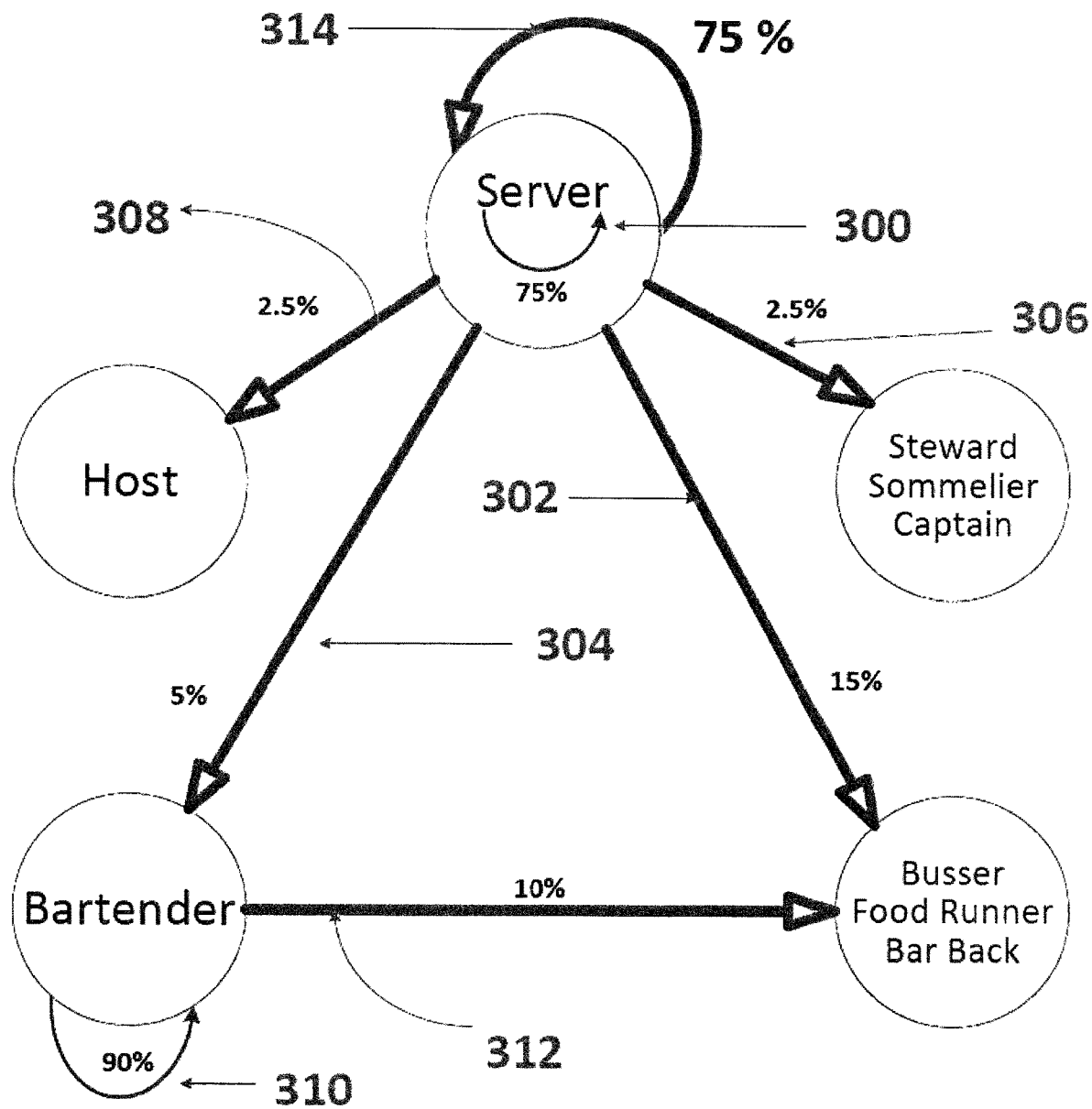
FIG. 3 is a graphic illustration of a exemplary distribution rules.

Referring now to FIG. 2A, a logical view of a gratuity management system is illustrated. A client, such as a restaurant, may have a server 200 and a database 202 for storing transaction information and employee information, as well as a back office accounting management system 204 that handles accounting and payroll functions. In embodiments, the gratuity management system includes an interface component 206 that integrates with the business's systems to extract the transaction information and employee information to be used in determining the gratuity allocations.

In an embodiment, the interface component 206 extracts transaction and employee information and creates a computer-readable file containing at least a portion of the transaction information and the employee information for use by the gratuity management system. The computer-readable file is communicated to the database 214 and stored for use by the processor 212 in determining the gratuity allocations for each of the employees. The computer-readable file may be an XML, file containing transaction information and the employee information in a standardized format for communication to the database. Other file formats may be used, such as text or database files, and may include proprietary or standardized file formats. In this manner, the interface component 206 may be adapted to interface with a variety of client systems of different types without requiring modification to the database or processor. In yet other embodiments, the interface component 206 gather configuration and setting information from rest of the gratuity management system on a periodic basis. In one embodiment, the interface component 206 initiates all communication with other components of the gratuity management system improving the security of the system. In other embodiments, one or more of the business's systems and the gratuity management system may be cloud-based, and the communication between the gratuity management system and cloud-based business system may be through dedicated interfaces. In such embodiments, the interface component 206 may include an application programming interface defined and implemented so that the gratuity management system is able to extract the necessary transaction information and employee information from the cloud-based business systems.

In one embodiment, the processor 212 and the database 214 are provided in a cloud computing system 210 accessible over the Internet 208. The processor 212 and/or the database 214 may accept incoming data from the interface component 206. The incoming data may be preprocessed and/or stored in the database 214 for further subsequent use. The system may then provide access to the determined gratuity allocations through an employee interface 216, that may include a web-portal, text message, email, instant message, or posting on social media website. The system may also provide an employer interface 218, such as the web-portal for employer use described in FIG. 1. The employer interfaced 218 may also provide access to the configurations module (shown in FIG. 1) for establishing the distribution rules and configuration the gratuity management system for a given business or organization. Depending upon the level of security required, the employer interface 218 may also communicate with the back office accounting management system 204, which may include business records and a payroll system for distributing the allocated gratuities to the employees. In this manner, the interface module enables the system to automatically gather the transaction information and employee information, and communicate the determined gratuity allocations back to the client's systems. As illustrated in FIG. 2A, the processor 212 is remote from the client's point of sale. In this manner, the processor 212 may service multiple points of sale for a client as well as multiple clients. In yet other embodiments, the point of sale system may be implemented in a cloud computing system, and the gratuity management system 100 interfaces with the cloud-based point of sale system using a cloud to cloud replication or synchronization. In a cloud to cloud system, the interface component 206 still facilitates transfer of the data from the point of sale system to the gratuity management system for use in determining the gratuity allocations.

Figure 2B:
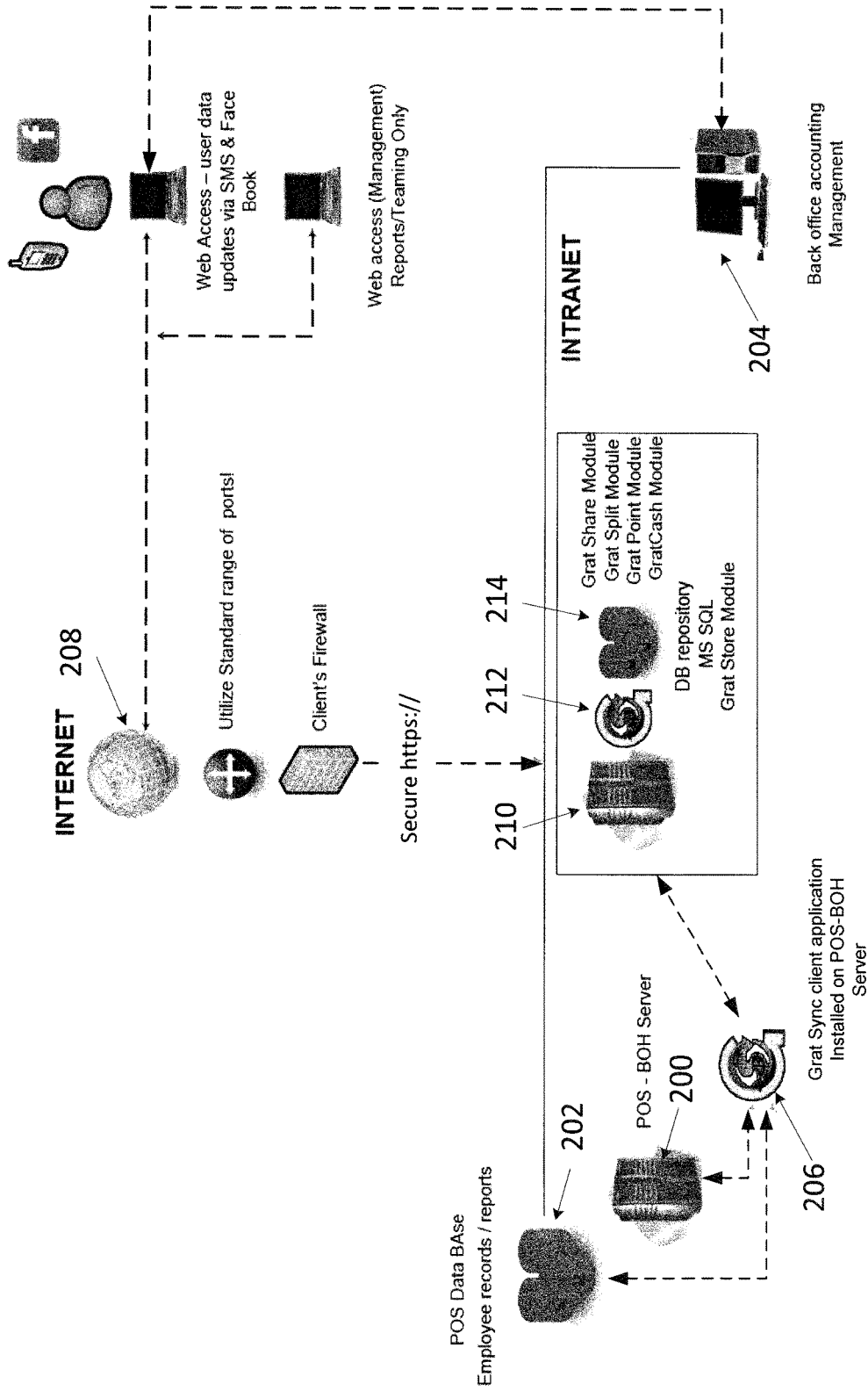
FIG. 2B is another schematic view of a gratuity management system.

Referring to FIG. 2B, in another embodiment, the gratuity management system may be implemented to operate locally on a client's computing system, where the client server 200 and database 202 may provide the processor and database for the gratuity management system. This configuration may be particularly effective for cruise ships or other environments with limited connectivity to external computing resources. The gratuity management system may also be integrated into a restaurant management system, such as the restaurant management system 108 that includes a point of sale system and an employee records system. By way of illustration, the operator of a cruise ship may prefer to host the gratuity management system using onboard computing systems to reduce the need for communication to or from the cruise ship while the ship is at sea. Other businesses may also prefer locally implemented systems due to connection limitations, security concerns, or preferences regarding the business's information technology infrastructure.

Regardless of the particular implementation selected, the gratuity management system provides a valuable service to the employees of the business by providing accurate and timely determinations of gratuity allocations.

The operation of the gratuity management system may be further illustrated through selected examples. By way of example, a business may elect to organize its gratuity-receiving employees into groups. As used herein, a "group" represents a set of employees who are given similar treatment for the purpose of determining gratuity allocations. A group may have one or more employees (i.e. members). An employee may belong to a different group depending upon the function the employee is performing during an accounting period. For example, an employee may work as a server during one shift, and work as a bartender during a different shift. In one example, a business may define five groups using the configuration module of the system, with the five groups being: servers, bartenders, food runners/bussers/barbacks, sommelier/stewarts/captains, and hosts.

Each gratuity group may be associated with a gratuity pool. As used herein a gratuity "pool" represents an aggregation of gratuities to be distributed to the employees of the group associated with the pool. For example, a portion of the gratuities generated by servers and bartenders may be allocated to a host pool, and the total gratuities in the hosts pool may be distributed among the members of the hosts group for a given accounting period.

In one example, the gratuity management system determines from the transaction information the total cash sales during an accounting period. The system may receive the total cash sales as part of the transaction information communicated to the system, or alternatively, the system may determine the total cash sales from individual transaction data contained in the transaction information. The system then determines a total cash gratuity amount from the total cash sales by applying a distribution rule. In one example, the system receives a distribution rule specifying that eight percent (8%) of total cash sales are to be deemed as cash gratuities. In other examples, the system may determine an average gratuity percentage for all credit card transactions in the accounting period, and that average gratuity percentage may be applied to the total cash sales to determine the total cash gratuity. The total cash gratuity may then be allocated to one or more employees or one or more gratuity pools to be distributed among the employees in accordance with the distribution rules.

In another example, the gratuity management system determines a total cash gratuity amount, at least in part, from declared cash gratuities received from the employees and uses the declared cash gratuities to determine a gratuity allocation for each employee. Some businesses require gratuity generating employees to report, or declare, the total amount of cash gratuities received by the employee during a given accounting period. This declared cash gratuity is often recorded along with the transaction information or employee information discussed above. Because a declared cash gratuity is associated with a particular employee, the gratuity management system may apply the appropriate distribution rules to that cash gratuity. In addition, the gratuity management system may treat the declared cash gratuity as money received by the employee, and deduct the amount of the declared cash gratuity from the total gratuity allocated for that employee when distributing the allocated gratuities to the employees. If the declared cash gratuity exceeds the total gratuity allocated to an employee, the employer may require the employee to turn over a portion of the cash gratuity or otherwise offset the employee's compensation to achieve the appropriate gratuity allocation.

In other embodiments, a business may impose an imputed cash gratuity distribution rule. An imputed cash gratuity is the minimum amount of cash gratuity deemed to have been received based on the total cash sales by a particular employee. An imputed cash gratuity may be used in lieu of or in addition to declared cash gratuities. For example, a business may establish a distribution rule that requires employees to declare cash gratuities but that imposes an imputed cash gratuity if the declared cash gratuities are less than a value established by government regulation (e.g. 8%). Alternatively, the minimum value for imputed cash gratuity may be established by the customs of a given business or industry, or may be agreed to by a service employees union. The imputed cash gratuity is used to determine an employee's required contributions or tip-outs to other employees or pools. In addition, the imputed cash gratuity may be deducted from the total gratuity amount due to a given employee based upon the assumption that the employee received at least that amount in cash gratuities. The application of imputed cash gratuities may result in a negative gratuity allocation for a given employee, which indicates that the employee has retained a portion of the total gratuity that should be distributed to other employees. A business may elect to require the employee to contribute the deficiency to the employer for redistribution, or alternatively, the gratuity management system may carry the deficiency forward to the next accounting period to offset future gratuity allocations to the employee. In this manner, the gratuity management system may be used to promote accurate reporting of cash gratuities resulting in improvements in the equitable distribution of gratuities among employees, and improvements in account and tax records for the business.

In another example, the gratuity management system determines a total gratuity amount for the accounting period from the transaction information and determines the gratuity allocation for each of the plurality of employees based on the total gratuity amount for the accounting period. A distribution rule may specify that gratuities are to be allocated based on the hours worked by each employee relative to the total hours worked by all gratuity-receiving employees in the accounting period.

In yet another example, the gratuity management system receives a classification of the plurality of employees into one of a plurality of groups based on the job function of the employee. The classification may be received with the employee information or with the distribution rules, but in either case, the classification identifies which group, if any, each employee belongs to for purposes of allocating gratuities. After defining the groups, the system may allocate the received gratuities to form a gratuity pool for each gratuity group based on the gratuity distribution rules and then allocate the gratuity pool for each gratuity group between the employees of the gratuity group based on the distribution rules. By way of illustration, in a restaurant having two groups, servers and bussers, the gratuities received by the servers may be allocated 75% to a servers pool and 25% to a bussers pool. The servers pool may then be allocated to the employees in the server group based on the percentage of total gratuities generated by each employee in the server group. In contrast, the bussers pool may be allocated to the employees in the bussers group based on the number of hours worked by a given busser divided by the total hours worked by all bussers in the bussers group during the accounting period. In this manner, separate distribution rules may be defined for the allocation of each gratuity pool.

In another example, the gratuity management system allows the portion of the total gratuities received by a first group of employees to be allocated to a second group of employees based on the number of members in the second group of employees. By way of illustration, the portion of the gratuities received by the servers group may be allocated to the bussers group based on the number of members in the bussers group. The bussers may receive an allocation of 15% if there are greater than or equal to five (5) bussers working during a given shift. If fewer bussers are working, the allocation may be reduced to account for the increased burden on the servers due to the lack of support from the bussers. For example, if only four (4) or only three (3) bussers work during a shift, the allocation may be reduced to 12% or 9% respectively. The specific numbers and percentage may be specified in the distribution rules, and the number of employees may be determined based on hours worked during the given period. In this manner, gratuity management system implements a dynamic tip-out system, where the percentage allocated to a group is determined at least in part by the number of members in that group according to the contribution made by that group to providing the service to the customers.

In another example, determining the gratuity allocation for each of the plurality of employees may include allocating a fixed amount of the gratuities received by a member of a first group to a second group of employees provided that the gratuities received by the member of the first group are greater than or equal to a threshold. By way of illustration, a restaurant may have a gratuity distribution rule that requires each server to contribute a fixed amount to a host pool. The host pool may then be allocated among the one or more hosts who participate in the host pool. In this manner, the gratuity allocation to the host pool is not determined as a percentage of sales but as a fixed amount contributed by each server. A restaurant may further define the distribution rule such that a server is only required to contribute the fixed amount if that server receives total gratuities greater than or each to a defined threshold. This may result in a distribution rule that requires a server to contribute $10.00 the host pool, but only if that server received at least $50.00 in gratuities during the shift. The distribution rules may also define other variations and permutations such as modifying the fixed contribution, or providing both fixed and percentage contributions as may be appropriate for the specific business. In this manner, the gratuity management system is able to efficiently implement a wide variety of economic arrangements that may be desired by businesses that engage in the allocation of gratuities among various groups of employees.

In yet another example, the gratuity management system receives a gratuity factor for each employee, or each employee in a gratuity group. The system then allocates at least a portion of the gratuity pool for a given gratuity group to the employees of that group based on the gratuity factor for each employee. The gratuity factor may correspond to an assessment of the employee's skill level in a particular job function. Alternatively, the gratuity factor may correspond to the employee's seniority with the business. The gratuity factor may be used alone or in combination with other factors, such as hours worked or percent of gratuities generated to determine the allocation for a given employee. In one example, an employee who worked 8 hours out of total of 80 hours may receive an allocation of 10% of the gratuities for a given gratuity pool. If, however, that employee was a senior employee with responsibility for training new employees, the senior employee may be assigned a gratuity factor of 1.5 such that the senior employee receives 50% more credit for hours worked. As a result, the senior employee would be deemed to have worked 12 hours out of a total of 84 hours resulting in an allocation of 14.3% of the gratuities for a given gratuity pool. In this manner, the gratuity factor may be used to adjust the allocation of gratuities to reward seniority, skill, or special assignments such as training, as may be appropriate for certain businesses.

In another example, two employees benefit from a gratuity pool containing $500. Employee #1 worked eight hours and twenty-two minutes, and is assigned a gratuity factor of 2. Employee #2 worked six hours and fifteen minutes, and is assigned a gratuity factor of 3. For each employee, a weighted time worked is calculated by multiplying the actual time worked by the gratuity factor resulting in weighted time worked for 964 minutes for Employee #1 and 1125 minutes for Employee #2. Each employee is then allocated a percentage of the gratuity pool based on the weighted time worked for that employee divided by the total weighted time worked by both employees in this example. As noted above, the gratuity factor to be may be based on one or more criteria, such as seniority, job responsibilities or others that may be determined by a given business as relevant to the allocation of gratuities within a given pool. This example is summarized in the following table.

|  | Employee #1 | Employee #2 |
| --- | --- | --- |
| Time Worked (t) | 8 hr. 22 min. | 6 hr. 15 min. |
| Gratuity Factor (f) | 2 | 3 |
| Weighted Time Worked = (t*f) | 964 min. | 1125 min. |
| Total Weighted Time Worked (T) | 2089 min. | |
| Percent of Gratuity Pool Allocated = ((t*f)/T) | 46.15% | 53.85% |
| Allocated Gratuity | $230.73 | $269.27 |

In yet another example, the gratuity factor may be determined from a job code, such that the gratuity allocation favors certain job codes over others. The gratuity factor may be communicated to the system with the employee data or the distribution rules.

In yet another example, the gratuity management system determines a gratuity allocation based upon total sales by a given employee. As with hours worked or gratuities generated, the gratuity management system may determine the total sales attributable to an employee and allocate at least a portion of the received gratuities to that employee based on the total sales by that employee. By way of illustration, servers are typically responsible for food sales. A portion of the gratuities generated by a servers group may be allocated to the servers pool according to a distribution rule based upon the food sales generated by each server. The percent of total food sales by each server in the servers group is calculated, and the servers pool may be distributed to each server based upon their respective percentage of total food sales. In various embodiments, distribution rules based on various sales may be used, such as beverage, wine or liquor sales. In yet other embodiments, sales of products or novelty items may be factored into the distribution of gratuities. Moreover, either net sales or gross sales, or a custom definition of sales, may be used in the computation of the gratuity allocation for each employee.

In yet another example, the gratuity management system receives a classification of one or more employees as part of a team. As used herein, a "team" represents a set of employees who work together and are treated as single unit for purposes of allocating gratuities. In one example, multiple servers handing a large party or banquet may be grouped as a team. A team may be a member of a gratuity group and may benefit from a gratuity pool just as an individual employee would as previously described. Within a team, however, gratuities may be allocated uniformly to all members. As with groups, teams may be configured and reconfigured through the configurations module of the gratuity management system as employees are assigned and reassigned to different roles.

In yet another example, a restaurant may organize its employees into a servers group that generates gratuities and a non-servers group that does not generate gratuities. The restaurant may establish a distribution rule that each server retains a certain percentage, such as 75%, of the total gratuities generated by that individual server, with the remainder (i.e. 25%) of the generated gratuity being transferred to a pool to be allocated among the members of the non-servers group. The non-server pool may then be allocated to the non-server employees based on another distribution rule. For example, the non-servers pool may be allocated according to the number of hours worked by each employee in the group relative to the total number of hours worked by all employees in the group.

In various embodiments, the gratuity management system implements one or more of the distribution rules described above to determine the allocation of gratuities among the gratuity-receiving employees of the business. The interaction of example distribution rules may be illustrated through an example of a restaurant that uses a point of sale system that tracks credit card transactions by server or bartender, but that is unable to track cash sales by server or bartender. The restaurant classifies its gratuity-receiving employees into five groups, namely, servers, bartenders, food runners/bussers/barbacks, sommelier/stewarts/captains, and hosts.

Using the configuration module, the restaurant establishes a set of distribution rules as explained below. For purposes of illustration, one possible set of distribution rules is depicted in FIG. 3 to illustrate the operation of the gratuity management system. For all credit card originating gratuities received by a member of the server group, the generated gratuities are allocated 75% to the individual server (illustrated by line 300), 15% to the food runner/busser/barback pool (line 302), 5% to the bartender pool (line 304), 2.5% to the sommelier/stewarts/captains pool (line 306) and 2.5% to the host pool (308). For all credit card originating gratuities received by a member of the bartenders group, the generated gratuities are allocated 90% to the bartenders pool (line 310) and 10% to the food runner/busser/barback pool (312). Based upon the restaurant's operating procedures, no other groups are expected to be allowed to receive gratuities from customers.

For cash sales, the restaurant establishes a distribution rule that 15% of the total cash sales by members of the servers group are deemed to be generated gratuities by the servers group. The servers cash gratuities are distributed in the same percentages as credit card gratuities, however, the 75% of cash gratuities are allocated to a servers pool rather than to the individual server as the transaction data does not identify the server for individual cash transactions (line 314). Similarly, the restaurant establishes a distribution rule that 15% of the total cash sales by members of the bartenders group are deemed to be generated gratuities by the bartenders group and are distributed in the same percentages as credit card gratuities.

After the completion of an accounting period, the interfaced component extracts the transaction information, which includes at least the cash sale data, credit card sale data, and gratuity data, as well as, the employee information that includes at least hours worked and group classification for each employee. The system then determines a gratuity allocation for each employee by applying the distribution rules (such as those illustrated in FIG. 3) to the transaction information and the employee information. The host pool is allocated to each member of the host group based upon the number of hours worked by a given host compared to the total number of hours worked by all hosts in the group. The food runner/busser/barback pool is allocated to each member of the pool based on hours worked with a gratuity factor applied that rewards those senior bussers who were assigned a trainee during their shift. The sommeliers/stewards/captains pool is allocated to each member of the pool based on the hours worked by each member of the group during the accounting period. The bartenders pool is allocated to each bartender based on the percent of hours worked by each bartender without consideration of a gratuity factor. Finally, each member of the server group is allocated the portion of the credit card gratuities generated by that server. Each member of the server group is also allocated a portion of the server pool, which includes a portion of the calculated cash gratuities, according to the total hours worked by the given server compared to the total number of hours worked by all servers in the group during the accounting period. In other embodiments, the gratuity allocations may be determined by other distribution rules based on any of the factors discussed above, such as hours, sales, gratuity factors based on skills, points, or other metrics deemed important for a given business.

Once the gratuity allocations have been determined for each employee, the system communicates the determined gratuity allocations to a business records system to be distributed to the employees, such as in the next scheduled payroll. The system also makes the determined gratuity allocations available for the employees and employer to review so that all interested parties can review the gratuity allocations.

For ease of illustration, the gratuity allocation process has been illustrated with a limited number of employees, groups, and distribution rules. As the number of employees, groups, and distribution rules increase, the gratuity allocation process may become exponentially more complex. The presently disclosed system, however, extracts the necessary information, determines the gratuity allocations according to customizable distribution rules that may be specified by an employer, and provides the determined gratuity allocation for distribution and reporting. In this manner, the system substantially reduces the time and expense associated with managing gratuities and improves the accuracy of record keeping systems.

Figure 4:
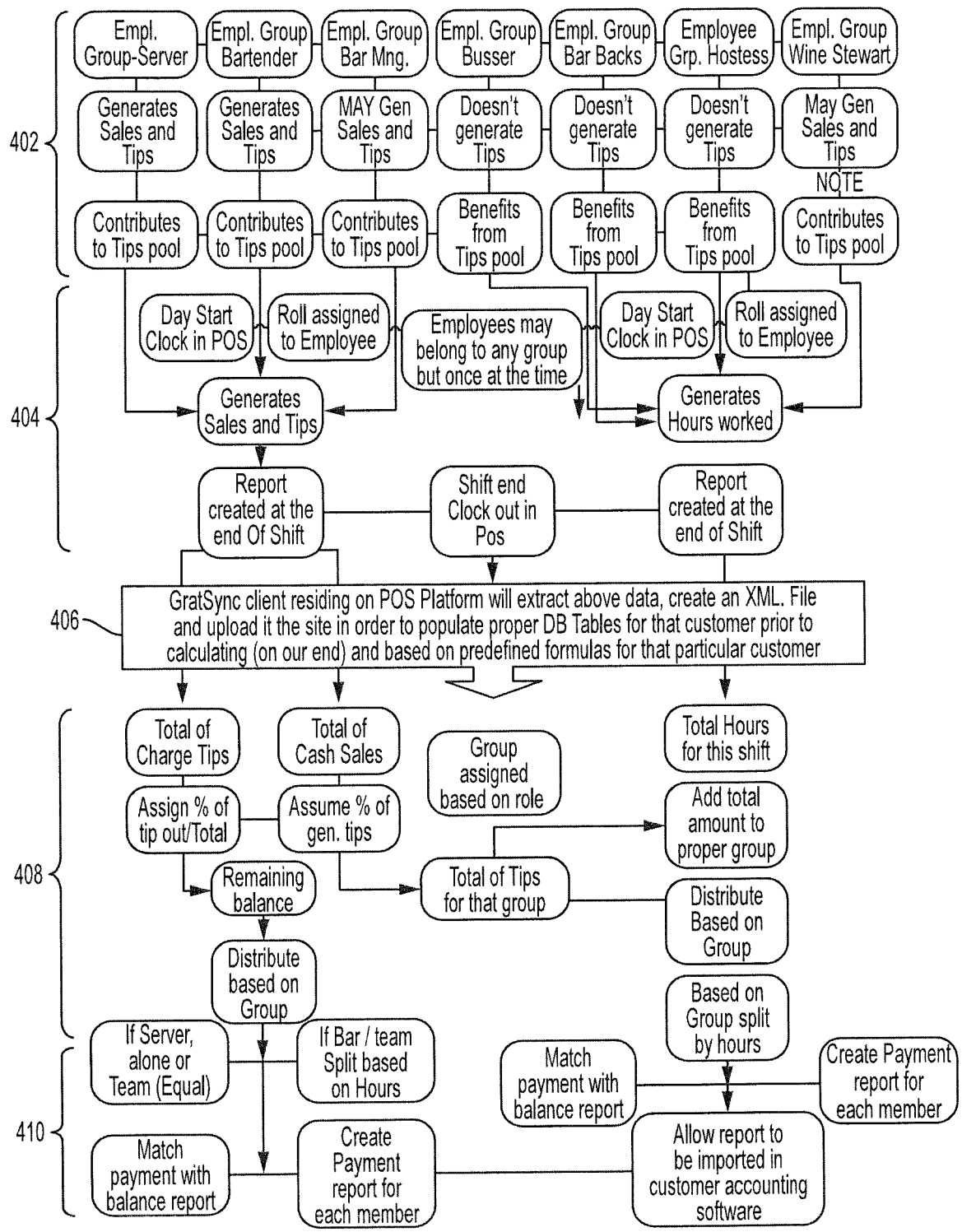
FIG. 4 is a flow diagram illustrating application of the gratuity management system.

Referring now to FIG. 4, another illustration of the gratuity management process is provided. As illustrated in FIG. 4, as a first step 402, the employees are assigned to groups and the characteristics of each group are defined, such as by using the configuration module previously discussed. As shown, each employee is categorized into one of seven groups: server, bartender, bar manager, busser, bar backs, hosts, or wine steward. Each group may be further classified regarding whether the group generates sales, tips or both. Each group may also be configured with regard to how the group members contribute to or benefit from a gratuity pool. The configuration of employees, groups and the relationships between them form at least a portion of the distribution rules defined by the employer for a given business.

In step 404, the business conducts operations during an accounting period generating transaction information and employee information. As shown, employees clock in and later clock out. This time entry may be through a restaurant management system that includes both a point of sale system and an employee records system as previously discussed. In one embodiment, an employee is limited to belonging to one group for the duration of an accounting period. In other embodiments, however, an employee may be classified into more than one group, such as when an employee is working in different roles during a single accounting period. If an employee is assigned to more than one group, the gratuity allocation may be performed for each role in which the employee worked. At the end of a given accounting period, a report may be generated that includes that transaction information and the employee information.

In step 406, the transaction information and employee information is compiled, for example, by the integration component. The transaction information and employee information may then be communicated as needed to the processor and database for use in determining the gratuity allocations. In step 408, the gratuity management system applies the distribution rules to the transaction information and the employee information to determine the gratuity allocation for each employee. This may include determining the total of gratuities charged to credit cards and the total of cash sales. From the total of cash sales, a total cash gratuity may be determined by applying a percentage specified in a distribution rule. The gratuities may then be distributed among the employees, either directly or through groups and pools as specified by the distribution rules. For those employees whose gratuity allocation is determined by hours worked, a gratuity factor, or sales, the appropriate computations may be performed to determine the allocation for the given employee.

Finally, in step 410, the determined gratuity allocations may be stored in the database and/or communicated to a business records system, payroll component, or otherwise reported for use by the business. The determined gratuity allocations may also be accessed through a web-portal by the employer and/or employee to facilitate access to the data.

The distribution rules received by the gratuity management system are used to determine the gratuity allocation for a given employee. In one embodiment, the gratuity management system determines the gratuity allocation for a given employee by constructing a formula based upon the distribution rules, and then applying the formula to the transaction information and employee information received. By way of illustration, the gratuity management system may define the following variables, which are calculated or provided as described below:

Ett—Total tips generated by Employee
Ecct—Total credit card tips generated by Employee
Ect—Total cash tips generated by Employee
Ecs—Total cash sales generated by Employee
Ets—Total Sales (net sale before taxes) generated by Employee
Etfs—Total Food Sales (net Food Sale only and before taxes) generated by Employee
Etbs—total Beverage Sales (net Beverage Sale only and before taxes) generated by Employee
Etws—total Wine Sales (net Wine Sales only and before Taxes)
$\alpha_{cs}$—Percent to take from total Cash Sales ($\alpha_{cs}$: 0-100, but normally it is 15)
$\alpha_{ts}$—Percent to take from total Sales ($\alpha_{ts}$: 0-100)
$\alpha_{tfs}$—Percent to take from total Food Sales ($\alpha_{tfs}$: 0-100)
$\alpha_{tbs}$—Percent to take from total Beverage Sales ($\alpha_{tbs}$: 0-100)
$\alpha_{tws}$—Percent to take from total Beverage Sales ($\alpha_{tws}$: 0-100)
PG—Pool group with Employees. One pool group can contain Employees with various Job Codes.
PGtime—Total work time of all Employees within Pool group.
Ttime—Total team time.
JC—Job Codes
p—Percent represented as number divided by 100 (e.g. p=15%=15/100=0.15)

Using these defined variables, the total tips generated by an employee may be computed using one or more of several methods. In one embodiment, total tips generated by an employee is determined from total credit card tips and a percentage of cash sales:

$$Ett = Ecct + \alpha_{cs} * \frac{Ecs}{100} = Ecct + Ect$$

In another embodiment, total tips generated by the employee may be determined as a percent of total sales:

$$Ett = \alpha_{ts} * \frac{Ets}{100}$$

In yet another embodiment, total tips generated by the employee may be determined as a percent of total food sales:

$$Ett = \alpha_{tfs} * \frac{Etfs}{100}$$

In yet another embodiment, total tips generated by the employee may be determined as a percent of total beverage sales:

$$Ett = \alpha_{tbs} * \frac{Etbs}{100}$$

In yet another embodiment, total tips generated by the employee may be determined as a percent of total wine sales:

$$Ett = \alpha_{tws} * \frac{Etws}{100}$$

As will be appreciated, the total tips generated by the employee may be defined in multiple ways, and may include combinations (e.g. food and beverage; beverage and wine). In this manner, the gratuity management system provides flexibility in selecting the criteria to be used in determining gratuity allocations so that the allocation method may be customized to the needs of a particular business.

The gratuity management system may also take into account the use of gratuity pools and their associated gratuity groups. In one embodiment, each gratuity pool/group ("PG") is defined by a union of job codes ("JC").

$PG_1, PG_2, PG_3 \ldots PG_K$; $K$—total number of PGs $PG_K = U_Z^Z JC_{Zk}$; $Z$—Number of Job Codes in $PG_k$ In this manner, the gratuity pool/group definitions may be determined by the job code assigned to each employee and reported in the employee information.

The distribution rules may require those gratuity groups that generate gratuities distribute a portion of the generated gratuities to other groups. These relationships may be mathematically represented as follows:

$PG_1(P_1) \to PG_2$ Pool Group 1 gives certain percent ($P_1$) of total tips to Pool Group 2

$PG_1(P_2) \to PG_3$ $PG_2(P_3) \to PG_3$

...

$PG_l(p_j) \to PG_k$; $k \neq l$; $k, l \in \{1 \ldots M\}$; $M < K$;

$M$ – total number of $PGs$ that receive tips;

$0 \leq p_j \leq 100$; $p_1 + p_2 + \ldots + p_j \leq 100$

As noted above, gratuity group 1 ($PG_1$) transfers a percentage ($p_1$) of its generated gratuities to gratuity pool 2 ($PG_2$). In embodiments, if a gratuity group had no members working during an accounting period then any transfers to that gratuity groups pool are cancelled, and may be retained by the generating group or distributed in another manner among those employees who did work during the accounting period.

Applying the above formulas and definitions, the percentage of generated gratuities to be deducted from a given group or employee to be distributed to other groups or employees may be represented as follows:

$P = \Sigma_{j=1}^m p_j$; $m$—number of Pool Groups that receive tips

The gratuity pool/group designations may also define how gratuities are distributed among employees with that group. In an embodiment, the gratuities may be distributed by time worked or individually. In addition, for those gratuity groups whose members generate sales, the members may be classified into teams that split generated gratuities equally.

In one scenario, a gratuity pool/group contains only employees that generate sales and do not receive tips from other groups (e.g. servers). The gratuity pool/group also gives a percentage to other gratuity pool/groups, and teams are possible. The members of the gratuity pool/group share tips individually. In this scenario, the tips to be allocated to a given employee ("Ei") may be defined as follows:
a) Employee Isn't Part of a Team:

$E_i = Ett*(1-\Sigma_{j=1}^m p_j) - Ect = Ett*(1-P) - Ect$:

i∈{1 ... n}; n—number of Empl in Group
b) Employee is Part of a Team:

$E_i = [\Sigma_{k=1}^q Ett_k*(1-\Sigma_{j=1}^m p_j) - \Sigma_{k=1}^q Ect_k]/q = [\Sigma_{k=1}^q Ett_k*(1-P) - \Sigma_{k=1}^q Ect_k]/q$ i∈{1 ... q}; q—number of Empl in Team In another scenario, a gratuity pool/group doesn't generate sales, but receives tips from other groups (e.g. bussers). The gratuity pool/group shares tips based on the hours worked by each member of the group. In this scenario, the tips to be allocated to a given employee may be defined as follows:

$$E_i = \left[\sum_{l=1}^{r} PG_l * p_l\right] * \frac{Etime_l}{PGtime}$$

$$PGTime = \sum_{i=1}^{n} Etime_i; \quad n - \text{number of } Empl \text{ in Group}$$

$$PG_l = \sum_{i=1}^{n_l} Ett_i; \quad n_l = \text{number of } Empl \text{ in Group } 'l'$$

In a modification of the above scenario, the gratuity pool/group contains multiple job codes and each job code is assigned a gratuity factor. For example, a bussers group may be comprised of job codes ("JC") for senior busser, busser, and junior busser. Each of these job codes may be assigned a gratuity factor ("β") that is used to weight the gratuity allocation in favor of more experience employees. More generally, the job code and gratuity factor relationship may be depicted as follows:

$JC_1:JC_2:JC_3 \ldots JC_Z = \beta_1:\beta_2:\beta_3 \ldots \beta_Z$ $Z$—number of Job Codes in Pool Group Using the job codes and gratuity factors, each employees time is multiplied with the corresponding weight (i.e. gratuity factor), and the total worked tip for the group is computed as the total of the weighted times for each employee. In this modified scenario, the tips to be allocated to a given employee may be defined as follows:

$$E_i = \left[\sum_{l=1}^{r} PG_l * p_l\right] * \frac{Etime_l * \beta_z}{PGtime^{**}}$$

$$PGtime^{**} = \sum_{i=1}^{n} Etime_i * \beta_z;$$

$n$ total Employees in Pool Group, and $z$ corresponds to $JC_z$ whose member is $E_i$ In yet another scenario, a gratuity pool/group generates sales, receives tips from other gratuity groups, and gives a percent of their tips to other gratuity pools. The gratuity pool/group also allows for teams, and the gratuities are distributed with the group by time worked. In this scenario, the tips to be allocated to a given employee may be defined as follows:

a) Employee is not part of the team and there is no other teams in Pool group:

$$E_i = \left[\sum_{k=1}^{n} Ett_k * \left(1 - \sum_{j=1}^{m} p_j\right) + \sum_{l=1}^{r} PG_l * p_l - \sum_{k=1}^{n} Ect_k\right] * \frac{Etime_l}{PGtime}$$

b) Group has some teams:

Employee is not part of any team:

-continued $$E_i = \left[\sum_{k=1}^{n} Ett_k * \left(1 - \sum_{j=1}^{m} p_j\right) + \left(1 - \frac{\sum_{j=1}^{s} Ttime_j}{PGtime}\right)\sum_{l=1}^{r} PG_l * p_l - \sum_{k=1}^{n} Ect_k\right] *$$

$$\frac{Etime_l}{PGtime - \sum_{j=1}^{s} Ttime_j};$$

s – total number of teams in Pool Group $$Ttime_j = \sum_{k=1}^{q_j} Etime_k;\ q_j - \text{number of } Empl \text{ in Team } 'j'$$

$$PGtime = \sum_{i=1}^{n} Etime_i;\ n - \text{number of } Empl \text{ in Group}$$

Employee is part of some team:

$$E_i = \left[\sum_{k=1}^{q} Ett_k * \left(1 - \sum_{j=1}^{m} p_j\right) + \frac{Ttime}{PGtime}\sum_{l=1}^{r} PG_{l*p_l} - \sum_{k=1}^{q} Ect_k\right]/q$$

In yet another scenario, a gratuity pool/group generates sales, receives tips from other gratuity groups, gives a percent of tips to other gratuity pools and contains different job codes with corresponding gratuity factors. The gratuity pool/group shares tips by time worked and does not have teams. In this scenario, the tips to be allocated to a given employee may be defined as follows:

$$E_i = \left[\sum_{k=1}^{n} Ett_k * \left(1 - \sum_{j=1}^{m} p_j\right) + \sum_{l=1}^{r} PG_l * p_l - \sum_{k=1}^{N} Ect_k\right] * \frac{Etime_l * \beta_z}{PGtime^{**}}$$

$$PGtime^{**} = \sum_{i=1}^{n} Etime_i * \beta_z$$

where z corresponds to $JC_z$ whose member is $E_i$

Combining all of the foregoing, the gratuity to be allocated to a given employee may be determined by one of two equations depending on whether the employee shares tips based on time worked or individually. For employees that share tips based on time worked, the gratuity allocation may be defined as:

$$E_i = \left[\sum_{k=1}^{n} Ett_k * \left(1 - \sum_{j=1}^{m} p_j\right) + \left(1 - \frac{\sum_{j=1}^{s} Ttime_j^{}}{PGtime^{}}\right)\sum_{l=1}^{r} PG_l * p_l - \sum_{k=1}^{n} Ect_k\right] *$$

$$\frac{Etime_l * \beta_z}{PGtime^{} - \sum_{j=1}^{s} Ttime_j^{}}$$

For employees that share tips individual or in teams, the gratuity allocation may be defined as:

$$E_i = \left[\sum_{k=1}^{q} Ett_k * \left(1 - \sum_{j=1}^{m} p_j\right) + \frac{Ttime^{}}{PGtime^{}}\sum_{l=1}^{r} PG_l * p_l - \sum_{k=1}^{q} Ect_k\right]/q$$

$$Ttime_j^{**} = \sum_{k=1}^{q_j} Etime_k * \beta_z;\ q_j - \text{number of } Empl \text{ in Team } 'j'$$

$$PGtime^{**} = \sum_{i=1}^{n} Etime_i * \beta_z$$

Where the following are defined as follows:
n—total of Employees in group that do not belong to any team,
s—total number of teams in group
z—corresponds to $JC_z$ whose member is $E_i$
q—number of employee in team As shown by the above example, the gratuity management system may determine the gratuity allocation for a given employee based on a multitude of factors as defined by the distribution rules for a given business, which may result in numerous variations and alterations of the above formulas depending upon the distribution rules to be applied in a given business.

Figure 7:
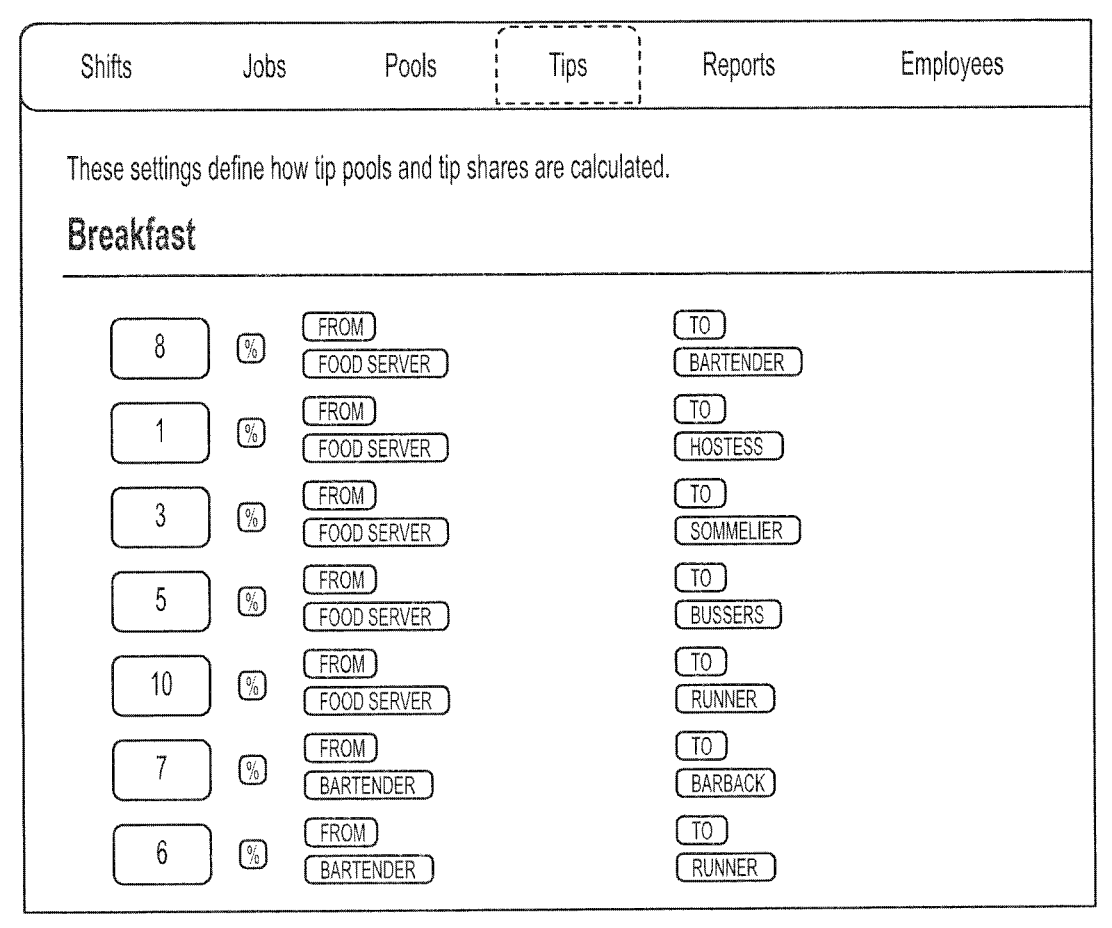

Referring now to FIGS. 5 through 7, an exemplary implementation of a configuration module is depicted. FIG. 5 illustrates one possible screen of a configuration module with which settings for various groups (identified as JOB) may be defined. As shown, each JOB may be configured to indicate whether the job generates sales, whether the job receives tips from a tip pool, whether the formula for calculating tips includes cash sales, and whether the members of the group will be treated separately or as a team. By way of explanation, the group "barback" does not generate sales, receives tips from a tip pool, does not generate cash tips, and the barbacks are treated as a team. In contrast, the group "food" server generates sales, receives tips from a pool, includes cash sales in the tip calculation, and each server is treated individually in the allocation. Other groups are similarly defined according to the gratuity allocation rules of the given business.

Referring now to FIG. 6, the rule for distributing gratuities from a gratuity pool to employees of a group may be defined. As shown, the food servers group has a distribution type of "equally," whereas the bartender group has a distribution type of "by generated hours." In an embodiment, the distribution type for a pool only applies to those employees who benefit from a gratuity pool. If an employee, such as a server, is treated individually and does not benefit from a servers pool, then the distribution type may be unnecessary for that pool.

Referring now to FIG. 7, another screen of the configuration module allows for the definition of the percentage of gratuities to be transferred from one group to another. As illustrated, the food servers group transfers 8% of its generated gratuities to the bartender pool, 1% to the host pool, 3 percent to the sommelier pool, 5 percent to the bussers pool, and 10 percent to the runner pool. Similarly, the bartender group transfers 7% to the barback pool, and 6% to the runner pool. If the business includes other gratuity-generating employee groups, those groups may be included here and the distribution to each of the gratuity-receiving groups defined accordingly.

In embodiments, distribution rules may vary between different accounting periods. FIG. 7 illustrates distribution rules for a breakfast shift. The distribution rules for the lunch and dinner shifts may be the same or different. On another screen (not shown), the employees of the business may be identified through the configuration module. Alternatively, employees may be identified through the received employee information allowing the business to add employees using only its internal restaurant management system software.

Referring now to FIGS. 8 and 9, example screens of an employer web-portal are illustrated. In FIG. 8, an employer may view a summary of employee and transaction information, such as each employee with the shift worked, job function (corresponding to a gratuity group or pool), hours worked, credit card tips generated, and total cash sales attributed to the employee. The information displayed may be selected to correspond with the information used to determine the gratuity allocation.

Referring to FIG. 9, another screen of the employer web-portal is illustrated, which reflects the determination of the gratuity allocation for a given employee. For each employee, the screen shows the total credit card tips generated by that employee (Total CC Tips), and the portion of those credit card tips to be distributed to other groups (CC Tip Out). Similarly, the Total Cash Sales generated by each employee, the Total Cash Tips determined by applying the appropriate distribution rule, and the portion of the cash tips to be distributed to other groups (Cash Tip Out). In this example, the computed credit card and cash tips outs will be reduced because no member of the barback group, the host group, or the sommelier group worked during the accounting period. Once the generated gratuities have been determined and allocated between the gratuity pools, the total of the gratuity pool in which each employee participates is shown (Pool). The employee's share of the pool is then determined (Pool Share). Because there is only one bartender and one runner, they each receive the full amount of their respective pools. The food servers in this example do not participate in pooling of their tips and, therefore, each is treated individually. The two bussers, Edgar and Samantha, share the busser pool of $26.75 according to the hours worked by each reflect in FIG. 8. Finally, the gratuity share to be distributed is determined after taking into account any retained cash gratuities by the employee. In this example, the food servers are assumed to have retained their total cash gratuity and, therefore, the amount of the gratuity to be distributed, such as through a subsequent payroll, is reduced accordingly.

FIGS. 8 and 9, illustrate one example of an employer a web-portal. In an embodiment, an employee web-portal (not shown) is provided in substantially the same format but with the employee limited to viewing only the data corresponding to the given employee.

In all of the foregoing, references to specific percentages are for illustration purposes only. The implementation of the gratuity management system may allow for the use any value (such as between 0% and 100%) to be used as part of the distribution rules. In addition, values may be expressed as percentages, decimals, or in any other form appropriate for use in the implementation of the gratuity management system. The use of examples herein is intended to illuminate aspects of the system and its operation and do not suggest any specific values that must or should be used by a given business in defining distribution rules or determining a gratuity allocation for employees.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any feature that could permissibly vary without resulting in a change in the basic function to which it is related. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances, the event or capacity cannot occur—this distinction is captured by the terms "may" and "may be." The term "instructions" as used herein with respect to a controller or processor may refer to computer executable instructions. The terms module and component as used herein refer to a collection of computer-executable instructions that implement one or more functions of the disclosed system.

While certain embodiments have been described, it must be understood that various changes may be made and equivalents may be substituted without departing from the spirit or scope of the present disclosure. In addition, many modifications may be made to adapt a particular situation or material to the teachings of the disclosure without departing from its spirit or scope.

What is claimed is:

1. A method of managing gratuity allocations, comprising:
   receiving, from a business by at least one processor, gratuity distribution information about gratuity distribution rules that determine how gratuities paid by customers of the business are to be allocated to employees of the business;
   receiving, from the business by the at least one processor, original transaction information and original employee information, where the transaction information includes information about customer sales and associated gratuities paid by the customers in connection with those customer sales during an accounting period, and where the employee information indicates the hours worked by a plurality of employees during the accounting period;
   calculating, by the at least one processor, a first gratuity allocation to the plurality of employees for the accounting period based on the received gratuity distribution information, the received original transaction information and the received original employee information;
   receiving with the at least one processor subsequent to calculating the first gratuity allocation, at least one of updated transaction information for the accounting period and updated employee information for the accounting period, where updated transaction information includes at least one change relative to the original transaction information and where updated employee information includes at least one change relative to the original employee information;
   calculating, by the at least one processor, a second gratuity allocation to the plurality of employees for the accounting period using at least one of the updated transaction information and the updated employee information, wherein the step of calculating the second gratuity allocation is performed immediately after receiving updated transaction information or updated employee information;

reporting, by the at least one processor, to a payroll system for the business, the second gratuity allocation and/or differences between the first gratuity allocation and the second gratuity allocation; and distributing, by the payroll system, gratuity payments to at least some the plurality of employees according to the second gratuity allocation.

2. The method of claim 1, wherein the original transaction information is received or obtained from a point of sale system for the business.

3. The method of claim 1, further comprising:

reporting, by the at least one processor, the first gratuity allocation to the payroll system for the business after calculating the first gratuity allocation.

4. The method of claim 1, further comprising:

receiving employee base pay information that indicates the hourly base pay that the employees of the business earn;

calculating a first payroll for the business that includes the amounts that each of the plurality of employees earned during the accounting period, wherein the amount that each employee earned includes base pay and an allocation of gratuities that was included in the calculated first gratuity allocation; and reporting, to the payroll system for the business, the first payroll for the business.

5. The method of claim 4, further comprising:

calculating a second payroll for the business using at least one of the updated transaction information and the updated employee information, wherein the second payroll for the business includes the amounts that each of the plurality of employees earned during the accounting period, wherein the amount that each employee earned includes base pay and an allocation of gratuities that was included in the calculated second gratuity allocation; and reporting, to the payroll system for the business, the second payroll for the business.

6. The method of claim 4, further comprising:

calculating a second payroll for the business using at least one of the updated transaction information and the updated employee information, wherein the second payroll for the business includes the amounts that each of the plurality of employees earned during the accounting period, wherein the amount that each employee earned includes base pay and an allocation of gratuities that was included in the calculated second gratuity allocation; and reporting, to the payroll system for the business, differences between the first payroll and the second payroll.

7. A system for managing gratuity allocations, comprising:

a computer memory; and at least one processor which is configured to perform a method comprising:

receiving, from a business, gratuity distribution information about gratuity distribution rules that determine how gratuities paid by customers of the business are to be allocated to employees of the business;

receiving, from the business, by the at least one processor, original transaction information and original employee information, where the transaction information includes information about customer sales and associated gratuities paid by the customers in connection with those customer sales during an accounting period, and where the employee information indicates the hours worked by the plurality of employees during the accounting period;

calculating, by the at least one processor, a first gratuity allocation to the plurality of employees for the accounting period based on the received gratuity distribution information, the received original transaction information and the received original employee information;

receiving, with the at least one processor and subsequent to calculating the first gratuity allocation, at least one of updated transaction information for the accounting period and updated employee information for the accounting period, where updated transaction information includes at least one change relative to the original transaction information and where updated employee information includes at least one change relative to the original employee information;

calculating with the at least one processor a second gratuity allocation to the plurality of employees for the accounting period using at least one of the updated transaction information and the updated employee information, wherein the step of calculating the second gratuity allocation is performed immediately after receiving updated transaction information or updated employee information;

reporting, by the at least one processor, to a payroll system for the business, the second gratuity allocation and/or differences between the first gratuity allocation and the second gratuity allocation; and distributing, by the payroll system, gratuity payments to at least some the plurality of employees according to the second gratuity allocation.

8. The system of claim 7, wherein the original transaction information is received or obtained from a point of sale system for the business.

9. The system of claim 7, wherein the method performed by the at least one processor further comprises:

reporting, by the at least one processor, the first gratuity allocation to the payroll system for the business after calculating the first gratuity allocation.

10. The system of claim 7, wherein the method performed by the at least one processor further comprises:

receiving employee base pay information that indicates the hourly base pay that the employees of the business earn;

calculating a first payroll for the business that includes the amounts that each of the plurality of employees earned during the accounting period, wherein the amount that each employee earned includes base pay and an allocation of gratuities that was included in the calculated first gratuity allocation; and reporting, to the payroll system for the business, the first payroll for the business.

11. The system of claim 10, wherein the method performed by the at least one processor further comprises:

calculating a second payroll for the business using at least one of the updated transaction information and the updated employee information, wherein the second payroll for the business includes the amounts that each of the plurality of employees earned during the accounting period, wherein the amount that each employee earned includes base pay and an allocation of gratuities that was included in the calculated second gratuity allocation; and reporting, to the payroll system for the business, the second payroll for the business.

12. The system of claim 10, wherein the method performed by the at least one processor further comprises:

calculating a second payroll for the business using at least one of the updated transaction information and the updated employee information, wherein the second payroll for the business includes the amounts that each of the plurality of employees earned during the accounting period, wherein the amount that each employee earned includes base pay and an allocation of gratuities that was included in the calculated second gratuity allocation; and reporting, to the payroll system for the business, differences between the first payroll and the second payroll.

* * * * *